Figure 1:
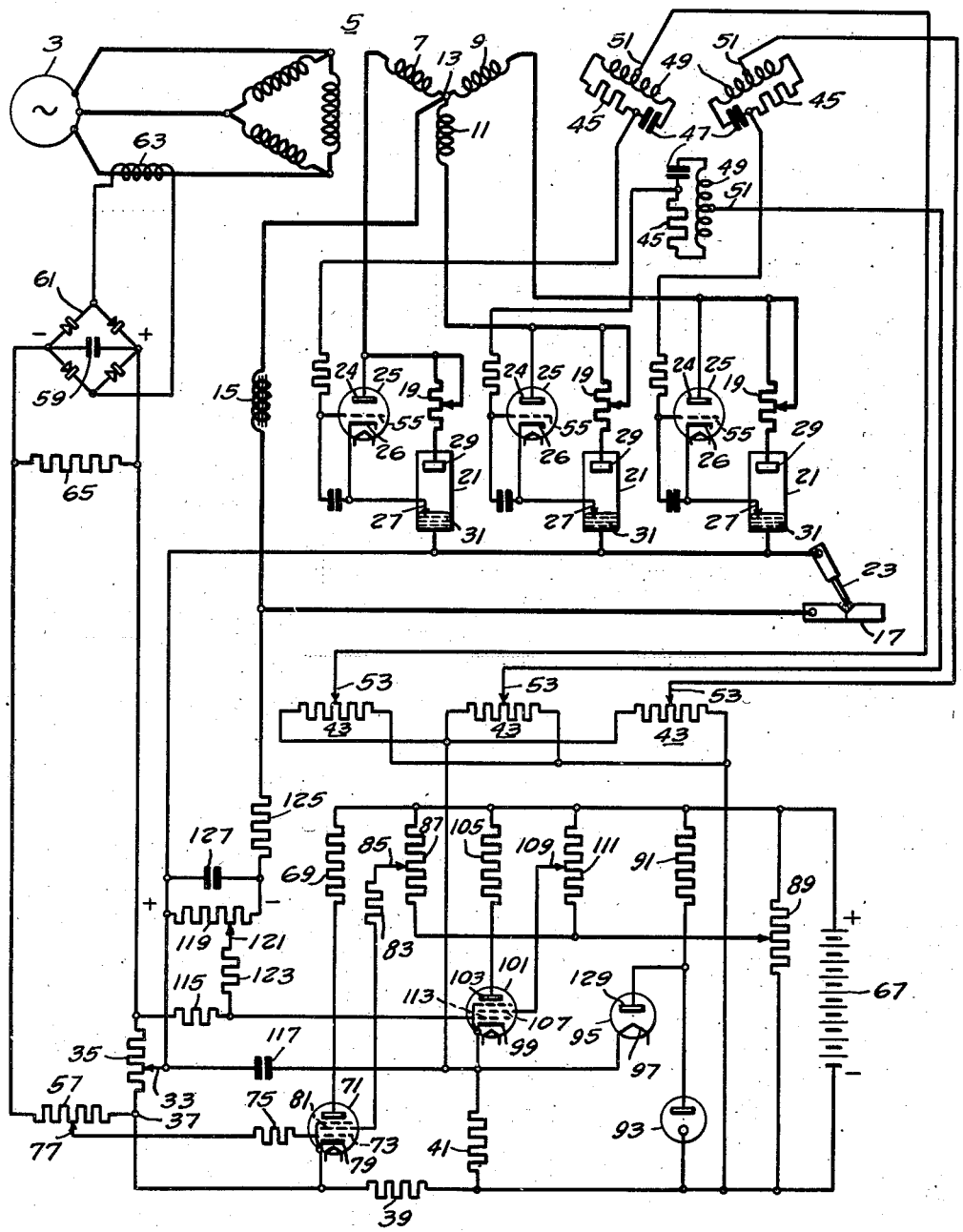

July 22, 1947.  S. J. MURCEK ET AL  2,424,324
ARC WELDER
Filed Jan. 7, 1944  2 Sheets-Sheet 2

WITNESSES:
E. A. McCloskey.
John R. Shipman

INVENTORS
Slavo J. Murcek and
Robert W. Price.
BY F. W. Lyle.
ATTORNEY

Patented July 22, 1947

2,424,324

UNITED STATES PATENT OFFICE 2,424,324

ARC WELDER

Slavo J. Murcek, Duquesne, and Robert W. Price, Murrysville, Pa., assignors to Westinghouse Electric Corporation, East Pittsburgh, Pa., a corporation of Pennsylvania Application January 7, 1944, Serial No. 517,308

23 Claims. (Cl. 315—137)

This invention relates to an electronic control system and has particular relation to a system for controlling the supply of power for arc welding.

In arc welding systems, it is desirable that the R. M. S. value of the current supplied to the welding arc be maintained substantially constant over a range of arc voltages corresponding to the arc lengths ordinarily used in down-hand arc welding. In other words, the arc welding current should remain substantially constant although the length of the arc may vary causing variations in the arc voltage. To enable welding rods of various diameters to be employed, the level at which the arc welding current should remain constant must be adjustable over a rather wide range.

While it is desirable that the welding current be maintained substantially constant for down-hand welding, it is also desirable for the arc current to increase with decreasing arc length when the voltage across the arc is less than a preselected value, of the order of 20–30 volts, for overhead welding. The amount of increase of the welding current with a decrease in arc length should be such that sputtering of the molten metal occurs when the arc electrode is too close to the work, to warn the operator of this condition.

It is also desirable that the voltage between the arc electrode and the work be rather low when the arc does not exist. This arrangement eliminates the possibility of serious shocking of the operator should he accidentally short circuit the arc electrodes. In addition, the welding current should be reduced to a small value when the arc is to be broken at the end of a weld to avoid the formation of a crater on the welded material because of excessive heat.

It is an object of our invention to provide a novel electronic control system for a variable impedance load such as an arc welder.

Another object of our invention is to provide an electronic control system suitable for an arc welder in which the welding current is maintained substantially constant over a predetermined range of arc voltages.

A further object of our invention is to provide an electronic control system suitable for an arc welder in which the welding current is maintained substantially constant over a range of arc voltages greater than a preselected value and is varied inversely as the arc voltage over a range of arc voltages less than the preselected value.

Still another object of our invention is to provide an electronic control system for an arc welder in which the voltage between the arc electrode and the work is comparatively low when an arc is not present therebetween.

It is a still further object of our invention to provide an electronically controlled arc welding system in which the welding current is maintained substantially constant over a range of operating arc voltages, but may be automatically reduced to prevent formation of a crater upon the removal of the arc electrode from a position adjacent the work to extinguish the arc.

More specifically, it is an object of our invention to provide an electronically controlled arc welding system in which the no-load arc electrode-work voltage is comparatively low, the welding current is maintained substantially constant over a range of arc voltages greater than a preselected value and is varied inversely with the arc voltage over a range of arc voltages less than the preselected value, and in which the welding current may be substantially reduced automatically at the instant of extinguishment of the arc when the arc electrode is removed from a position adjacent the work at the end of a weld.

In accordance with our invention, current is supplied to an arc welding load which includes a work member and an arc electrode, from a three-phase alternating current source through electric discharge valves of the arc-like type, such as ignitrons. The ignitrons rectify the alternating current and control the magnitude of the R. M. S. current which is supplied to the arc welding load. The magnitude of the current supplied is controlled by varying the instant in a positive half-period of the anode-cathode potential of each ignitron at which that ignitron is rendered conductive.

Apparatus is provided to control the instant in a positive half-period of the anode-cathode potential at which an ignitron is rendered conductive, hereinafter called the firing point, in accordance with the magnitude of the current supplied and the voltage existing between the arc electrode and the work member. When the arc electrode and work member are separated and there is no arc between them, the control apparatus conditions the ignitrons to be rendered conductive very late in each positive half-period. Consequently, the voltage between the arc electrode and work member which is available to shock the operator in the event of an accidental short circuiting is quite low.

After an arc has been struck between the arc electrode and the work member, the arc voltage varies largely with the length of the arc. If the arc length is such that the arc voltage is greater than a preselected value, the firing points of the ignitrons are determined by the difference between a voltage which varies with the welding current and a substantially constant voltage developed from an auxiliary source. The magnitude of these votages is such that the firing points of the ignitrons are varied with variations in the welding current to maintain the welding current substantially constant.

When the length of the arc is somewhat shorter, as is ordinarily used in overhead welding, the arc voltage is less than the preselected value. Under these conditions the firing points of the ignitrons are dependent upon the difference between the voltage which varies with the welding current and a voltage which varies with the arc voltage. The relative magnitudes of these two voltages is such that the welding current varies inversely with the arc voltage.

To stabilize the control and prevent hunting, a short time delay is provided in the variation of the firing point with a variation in welding current. Because of this time delay, the operator may remove the arc electrode from a position adjacent the work to extinguish the arc, and the welding current is at a reduced value at the time of extinguishment of the arc to prevent the formation of a crater. The particular arrangement which provides for a shifting of the firing points to an instant late in a positive half-period under no-load conditions is also effective to aid in shifting the firing point to effect a reduction in current just prior to extinguishment of the arc.

In a modification of our invention the apparatus controlling the firing points of the ignitrons is arranged to effect preheating of the arc electrode when it is placed against the work member prior to the establishment of an arc. The firing points are advanced to an instant very early in a positive half-period so that a maximum current flows through the arc electrode and work member. This current heats the electrode causing the emission of a few electrons so that, when the electrode is moved away from the work member immediately thereafter, the electrons thus emitted facilitate the striking of an arc between the electrode and the work member. After the arc is established, the current is maintained substantially constant in the manner previously described.

The novel features of our invention are set forth with particularity in the appended claims. The invention, however, with respect to the arrangement and operation thereof, together with additional objects and advantages will be best understood from the following description of specific embodiments thereof in which Figure 1 is a circuit diagram of the preferred embodiments of our invention, and Figure 2 illustrates a modification of our invention.

Figure 2:
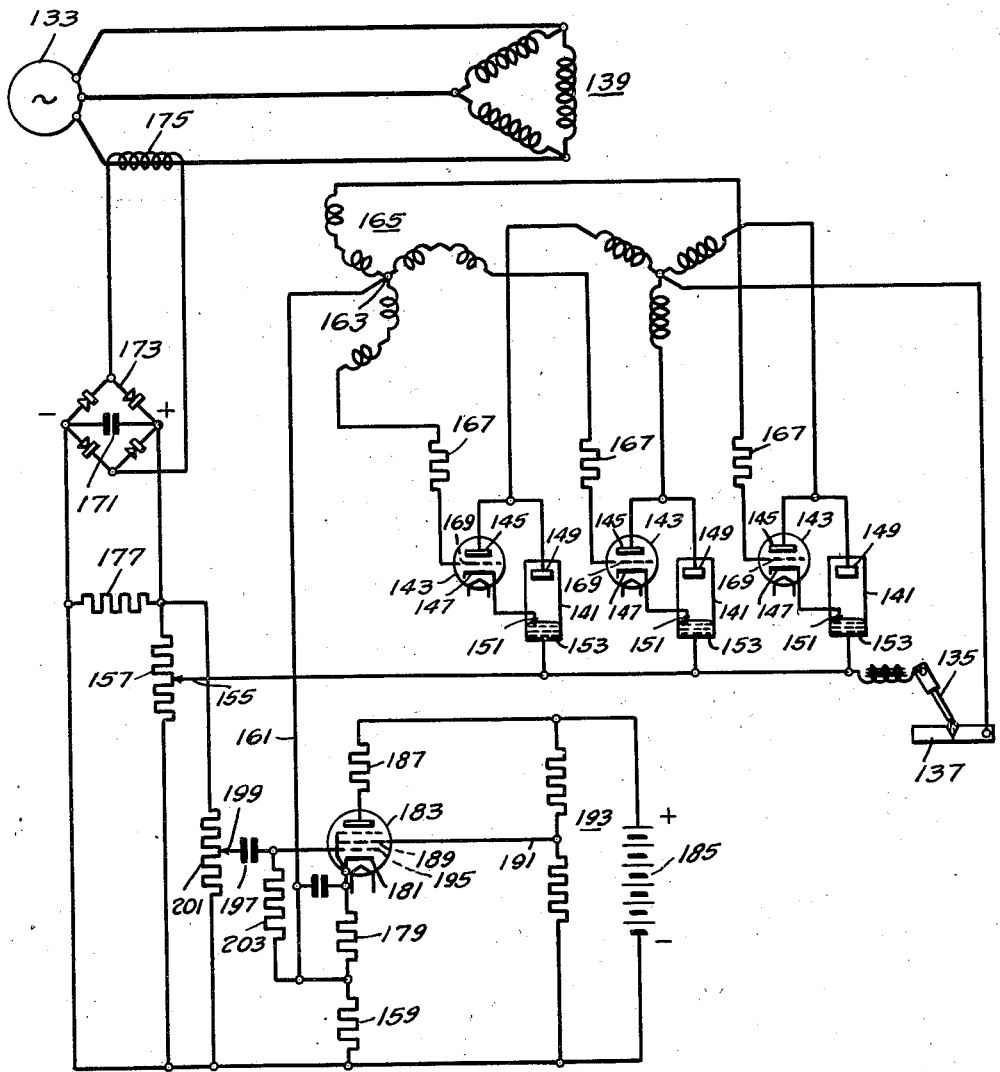

As shown in Fig. 1, a three-phase alternating current source 3 is connected to energize a three-phase transformer 5. The main secondary windings 7, 9, and 11, of the transformer are illustrated in a Y-connection, with the center 13 thereof connected through an inductance 15 to a work member 17. The outer terminal of each of the three-phase main secondary windings 7, 9, and 11 is connected through an individual resistor 19, and an individual ignitron 21 to the arc electrode 23. Thus power is supplied from the source 3 to the arc welding load, which includes the arc electrode 23 and work member 17, under the control of the ignitrons 21.

An electric discharge valve 25 of the arc-like type, preferably a thyratron hereinafter designated as the firing valve, has its anode 24 and cathode 26 connected between the end terminal of each of the three secondary phase windings 7, 9, 11 and the igniter 27 of the corresponding ignitron 21. When a firing valve 25 is rendered conductive during a half-period of the corresponding phase potential in which the anode 29 of the corresponding ignitron 21 is positive, current flows through the firing valve 25, the igniter 27 and the cathode 31 of the ignitron 21 to render the latter conductive.

The cathodes 26 of the firing valves 25 are connected through the igniter 27 and cathode 31 of the corresponding ignitrons 21, the center tap 33 of a potentiometer 35, the lower end 37 of the potentiometer 35, and a resistor 39 to another resistor 41. Three potentiometers 43 are connected in parallel across the last-named resistor 41, and correspond to the three firing valves 25. Auxiliary three phase Y-connected secondary windings 49 are provided on the transformer 5, and the center tap 51 of each winding 49 is connected to an intermediate tap 53 on the corresponding one of the three potentiometers 43. A resistor 45 and capacitor 47 are connected in series across the end terminals of each auxiliary secondary winding 49, the junction between the resistor 45 and capacitor 47 being connected to the grid 55 of the corresponding firing valve 25 associated with the main secondary winding 7, 9 or 11 having the same phase relation.

It is apparent that the grid-cathode potential of each firing valve 25 is made up of the potentials available in the cathode-to-grid circuit from potentiometer 35, resistor 39, corresponding potentiometer 43 and the corresponding auxiliary secondary winding 49.

An alternating potential of the same phase as the anode-cathode potential of the firing valve 25 appears across the auxiliary secondary winding 49 in the grid circuit. However, the capacitor 47 and resistor 45 in the circuit associated with the secondary winding 49 causes the alternating potential component impressed between the grid 55 and cathode 26 of each firing valve 25 to be displaced in phase relative to the anode-cathode potential of the firing valve. A 90° lagging phase displacement is preferable.

The potentiometer 35 is connected in series with another potentiometer 57 across a capacitor 59. The capacitor 59 is charged through a full wave rectifier 61 by a current transformer 63 energized from the source. A resistor 65 is connected in shunt across the capacitor 59 and is of such value that the capacitor potential is proportional to the current through the primary circuit of the transformer 5. Thus the voltage across the potentiometer 35 varies with the welding current.

The resistor 39, in the grid-cathode circuit of the firing valves 25, is connected across an auxiliary source of direct-current potential such as a battery 67 through another resistor 69 and an electric discharge valve such as a pentode 71. The control grid 73 of the pentode 71 is connected through a grid resistor 75 to an intermediate tap 77 on the potentiometer 57, and the junction 37 between the potentiometer 35 and the potentiometer 57 is connected to the cathode 79. The screen grid 81 of the pentode 71 is connected through a resistor 83 to the intermediate tap 85 on another potentiometer 87 which is energized from a voltage divider 89 across the auxiliary source 67. The arrangement is such that the pentode 71 is conductive only when the potential across potentiometer 57, and therefore the welding current, is extremely low. When the pentode 71 is conductive, current from the auxiliary source 67 flows through the resistor 39 and the potential developed across the resistor 39 tends to make the grids 55 of the firing valves 25 more negative.

Another resistor 91 and a voltage regulator tube 93 are connected in series across the voltage divider 89. The resistor 41 is then connected across the voltage regulator tube 93 in series with a high-vacuum diode tube 95. As a result a substantially constant potential of a predetermined magnitude is developed across the resistor 41, the positive terminal of the resistor 41 being connected to the cathode 97 of the high-vacuum diode tube 95.

The positive terminal of the resistor 41 is also connected to the cathode 99 of another electric valve such as a pentode 101, the anode 103 of which is connected through a resistor 105 to the positive terminal of the auxiliary source 67. The screen grid 107 of the pentode 101 is connected to an intermediate tap 109 on another potentiometer 111 energized from the voltage divider 89. The control electrode 113 of the pentode 101 is connected through a resistor 115 to the positive terminal of the potentiometer 35, the negative terminal 37 of which is connected through resistors 39 and 41 to the cathode 99 of the pentode 101. The intermediate tap 33 on potentiometer 35 is also connected directly to the cathode 99 of the pentode 101 through a stabilizing capacitor 117. The intermediate tap 33 on the potentiometer 35 is also connected to the positive terminal of still another potentiometer 119, the intermediate tap 121 of which is also connected through a resistor 123 to the control electrode 113 of the pentode 101. The end terminals of the potentiometer 119 are connected in series with a resistor 125 between the arc electrode 23 and the work member 17 so that a voltage which varies with the arc voltage appears across the potentiometer 119. A filter capacitor 127 is also connected in shunt with the potentiometer 119.

It is apparent that while the potential across potentiometer 119 tends to maintain the pentode 101 non-conductive, the potential across the potentiometer 35 tends to cause the pentode 101 to conduct. When the arc electrode-work member voltage is greater than a predetermined value, determined by the setting of the intermediate tap 121 on potentiometer 119, the pentode 101 remains non-conductive. However, when the arc electrode-work member voltage decreases below a predetermined value the pentode 101 becomes conductive. Current then flows from the auxiliary source 67 through the pentode 101 and resistor 41. The positive terminal of the resistor 41 becomes more positive than the anode 129 of the high-vacuum diode 95 and the latter ceases to conduct. As long as pentode 101 conducts current, the voltage across resistor 41 and consequently the voltage across potentiometers 43 varies with variations in the potential across potentiometer 37.

When power is first supplied to the unit from the three-phase alternating current source 3, an arc is not present between the arc electrode 23 and the work member 17. However, the secondary circuit is not completely open as the gap between the arc electrode 23 and the work member 17 is shunted by the potentiometer 119 and the resistor 125. No current is initially flowing through the primary circuit so that the voltage across the potentiometers 35 and 57 is practically zero while the potential across the potentiometers 43 is at the predetermined substantially constant value. Since the voltage across potentiometer 57 is practically zero, the pentode 71 conducts an appreciable current developing a voltage across resistor 39 tending to make the grids 55 of the firing valves 25 negative with respect to their cathode 26. The grid-cathode voltage of the firing valves is then made up of an alternating potential displaced in phase relative to the anode-cathode potential superimposed upon a direct-current potential equal to the algebraic sum of the potentials supplied from the corresponding one of potentiometers 43 and the resistor 39. The voltage developed across resistor 39 is of such magnitude that the resultant grid-cathode potential does not rise above the critical value necessary to render the firing valve conductive until an instant just prior to the positive peak value of the alternating component. This instant occurs late in the positive half-period of the anode-cathode potential, so that the RMS value of the current flowing thereafter in the secondary circuit is quite low. Consequently the potential difference between the arc electrode 23 and the work member 17 is also quite low and serious shocking of the operator in the event of an accidental short circuiting of the electrode, is avoided.

The voltage across each of the three potentiometers 43 is dependent upon the voltage of resistor 41 but the adjustability of the potentiometers 43 permits compensation for any difference in the firing characteristics of the ignitrons or the firing valves.

When the arc electrode 23 is placed in contact with the work member 17, as is usual prior to striking the arc, an appreciable current is drawn through the arc electrode and work member. This increase in current results in an increase in the voltage across potentiometers 35 and 57. The increase in voltage across potentiometer 57 causes the pentode 71 to become nonconductive, removing the voltage previously supplied to the grid-cathode circuit of the firing valves through resistor 39. The direct-current component of the grid-cathode potential of the firing valves 25 now depends upon the difference between the potential supplied from potentiometer 35 and the substantially constant potential supplied from the corresponding potentiometer 43.

After the arc electrode 23 is placed in contact with the work member 17, it is usually drawn away from the member 17 immediately to establish an arc between the electrode and the work member. The movement of the arc electrode 23 and consequently the length of the arc gap is, of course, under the direct manual control of the operator. The voltage across the arc is largely dependent upon the length of the arc. If this voltage is above the preselected value as determined by the setting of the intermediate tap 121 on potentiometer 119, the pentode 101 is maintained nonconductive. The firing point of each of the ignitrons 21 depends upon the difference between the voltage supplied from potentiometer 35, which varies with the welding current, and the substantially constant voltage supplied through the corresponding potentiometer 43. If the operator moves the arc electrode 23 further from the work member 17, the arc resistance increases and the welding current tends to decrease. This tendency is reflected in a decrease in the voltage across potentiometer 35 making the grids 55 of the firing valves 25 more positive with respect to their cathodes 26. As a result the firing point of each of the ignitrons is advanced to compensate for the increased arc resistance and thereby to maintain the welding current substantially constant. On the other hand, if the operator moves the arc electrode 23 closer to the welding member 17, the welding current tends to increase, causing the firing point of each of the ignitrons to be delayed until a later instant in a positive half-period and the welding current remains substantially constant.

If the operator is doing overhead welding, and therefore desires a short arc length to facilitate the transfer of metal to the work and prefers to avoid large variations in the amount of power supplied by variations in the length of the arc, he shortens the arc gap until the arc voltage is less than the preselected value necessary to maintain the pentode 101 nonconductive. As long as the arc voltage remains below this preselected value, the pentode 101 conducts current and the magnitude of the current thus conducted varies inversely with variations in the arc voltage. When the pentode 101 becomes conductive, the high-vacuum diode 95 becomes nonconductive and the voltage across resistor 41, and therefore the voltage supplied from potentiometers 43, varies with the conductivity of the pentode 101. The relative magnitudes of the voltages developed while pentode 101 is conductive are such that the resultant grid-cathode potential of the firing valves rises above the critical value necessary to render the firing valves conductive at an instant in each positive half-period of the anode-cathode potential to make the welding current vary substantially inversely with the arc voltage. The degree of variation is such that a very high-current flows when the arc electrode gets too close to the work member for good welding. This high current causes a sputtering of the molten metal to warn the operator that the length of the arc needs to be increased.

To stabilize the control apparatus, and prevent hunting in the variation of the firing points of the ignitrons to compensate for changes in arc length, the capacitor 117 is provided between the intermediate tap 33 on the potentiometer 35 and the positive terminal of resistor 41. This capacitor 117 interposes a brief time delay between the variation in arc length and the following variation in the firing points of the ignitrons. The amount of the time delay is, of course, dependent upon the size of the capacitor.

The capacitor 117 also serves another purpose in addition to that of stabilizing the control circuit. When a welding operation is completed, the operator merely moves the arc electrode far enough away from the work member to break the arc. When the arc electrode 23 is moved away from the work 17 the welding current tends to decrease. Ordinarily such a decrease would act through the control circuit to cause a variation in the firing points of the ignitrons tending to bring the welding current back up to its original value. However, when breaking the welding arc, the movement of the arc electrode is ordinarily so rapid that with the time delay afforded by the capacitor 117 the welding current may be reduced to a value such that pentode 71 again becomes conductive and the firing points of the ignitrons are delayed to an instant late in a positive half-period. Consequently, at the time of extinction of the arc, the welding current is substantially reduced to prevent the formation of a crater on the completed weld. As soon as the arc is extinguished, the voltage across the arc electrode and work member is again reduced to its low original no-load value.

In the modification shown in Fig. 2 a somewhat simplified control system is provided. This apparatus provides for constant current regulation and crater elimination, but does not have the low no-load potential between the arc electrode and work member which was provided in the embodiment of Fig. 1. In the modified circuit power is again supplied from a three-phase source 133 to the arc electrode 135 and work member 137 through a three-phase transformer 139 and three ignitrons 141, one of which is provided for each phase. Each ignitron 141 is also provided with a firing valve 143, the anode 145 and cathode 147 of which is connected between the anode 149 and the igniter 151 of the ignitron 141. As in Fig. 1, the flow of welding current is determined by the instant in a positive half-period at which an ignitron 141 is rendered conductive. However, the apparatus for supplying the grid-cathode potentials of the firing valves 143 differs from that shown in Fig. 1.

The cathodes 147 of each of the firing valves 143 is connected through the igniter 151 and cathode 153 of the corresponding ignitron 141 to an intermediate tap 155 on a potentiometer 157, the negative terminal of which is connected through a resistor 159 and conductor 161 to the center tap 163 of Y-connected auxiliary three phase secondary windings 165 of the transformer 139, and a grid resistor 167 to the grids 169 of the firing valves 143. The potentiometer 157 is connected across a capacitor 171 which is charged through a full wave rectifier 173 from a current transformer 175 coupled to the primary circuit of the main transformer 139. A resistor 177 is connected in parallel with the capacitor 171 to limit the voltage thereof. Thus, the voltage across the potentiometer 157 varies with the welding current.

The resistor 159 in the grid-cathode circuit is also connected through a resistor 179 to the cathode 181 of an electric valve such as a pentode 183, the anode of which is connected to the positive terminal of an auxiliary source of direct-current potential 185 through another resistor 187. The negative terminal of source 185 is connected to the other end of resistor 159. The screen grid 189 of pentode 183 is connected to an intermediate point 191 on a voltage divider 193 across the auxiliary source 185. The control grid 195 of the pentode 183 is connected through a capacitor 197 and an intermediate tap 199 on a second potentiometer 201 in parallel with the first potentiometer 157. The negative terminal of the second potentiometer 201 is, of course, connected through the resistors 159 and 179 to the cathode 181 of the pentode 183. The control electrode 195 of the pentode 183 is also connected to the cathode 181 through another resistor 203 and the resistor 179.

It is apparent that grid-cathode potential of the firing valves 143 is made up of an alternating potential displaced in phase relative to the anode-cathode potential by windings 165 and a direct-current potential equal to the algebraic sum of the voltage across the resistor 159 and the voltage between the intermediate tap 155 and the negative terminal of the first potentiometer 157. As previously set forth, the potential supplied through the grid-cathode circuit from the first potentiometer 157 varies with the welding current and the potential supplied from the resistor 159 depends upon the conductivity of the pentode 183.

When no arc exists between the arc electrode 135 and work member 137, the welding current is zero, as is the potential across the first potentiometer 157. The control grid and screen grid voltages of the pentode 183 are then such that the pentode conducts current equal to approximately one-half of its zero grid voltage plate current. This is true because of the biasing potential appearing across the resistor 179 as a result of the flow of current through the pentode. The potential thus developed across the resistor 159 causes the resultant grid-cathode potential of the firing valves to rise above the critical value necessary to render the firing valves conductive at an instant early in a positive half-period. However, since the anode-cathode circuit of the ignitrons 141 is incomplete, no current flows therethrough.

When the arc electrode 135 is placed in contact with the work member 137 preparatory to starting a welding arc, the anode-cathode circuit of the ignitrons 141 is completed and the resultant current is very high. The high welding current causes a comparatively high voltage to appear across the first and second potentiometers 157 and 201. Consequently, the direct-current component of the grid-cathode voltage of the firing valves becomes highly negative causing the ignitrons 141 to be rendered conductive later in each positive half-period reducing the current conducted by the ignitrons. However, the rapid rise in voltage across the second potentiometer 201 causes a surge of current through the coupling capacitor 197 and the resistors 203 and 159. This surge in current through resistor 203 develops a voltage which makes the control grid 195 of the pentode 183 more positive with respect to its cathode 181. The resultant increase in the current conducted by the pentode 183 further increases the voltage appearing across the resistor 159 and the combined effect causes the ignitrons 141 to become conductive much earlier in each positive half-period, resulting in an increase in current through the arc electrode 135. As soon as the coupling capacitor 197 accumulates a charge equal to the voltage differential between the intermediate tap 199 of potentiometer 201 and the positive terminal of resistor 159, the flow of current through the grid resistor 203 ceases and the control grid 195 of the pentode 183 resumes its former voltage level with respect to the cathode 181. It follows that voltage across the resistor 159 also drops to its former level and the ignitrons 141 once again become conductive later in each positive half-period to reduce the current through the welding electrode to its normal level, an arc having been established by separating the arc electrode 135 and the work member 137 during the high-current surge.

It is to be noted that the surge of high current through the arc electrode 135 just prior to and during the establishment of the arc causes a partial emission of electrons which facilitates the striking of the arc.

As long as an arc exists between the arc electrode 135 and the work member 137, the firing point of each of the ignitrons 141 is varied in accordance with the difference between the voltage supplied from the first potentiometer 157 and the substantially constant voltage supplied from the resistor 159, to maintain the welding current substantially constant. The value of the substantially constant welding current may, of course, be adjusted by adjusting the position of the intermediate tap 155 of the first potentiometer 157. If this intermediate tap 155 is moved toward the positive terminal of the potentiometer, the ignitrons become conductive later in each half-cycle and the welding current is maintained at a lower level. Conversely, if the intermediate tap is moved toward the negative terminal, the welding current is maintained at a higher level.

The magnitude of the high surge current under short circuit conditions is controlled by the setting of the intermediate tap 199 on the second potentiometer 201. If the intermediate tap 199 of the second potentiometer 201 is moved towards its positive terminal, the coupling capacitor 197 must charge to a greater voltage which requires a longer time. Consequently, a greater time delay is introduced between the variation in welding current and the following variation in firing point of each of the ignitrons. Movement of the intermediate tap 199 on the second potentiometer 201 toward its negative terminal, of course, decreases the amount of time delay.

When the length of the arc is suddenly elongated in the process of breaking the arc at the end of a welding operation, the voltage across potentiometer 201 decreases rapidly. As a result the capacitor 197 discharges through part of potentiometer 201, resistors 159 and 203, causing the control grid 195 of the pentode 183 to become more negative. The amount of current conducted through the pentode 183 is therefore reduced, and, as a result, the direct-current component of the grid-cathode voltage of the firing valves 143 becomes more negative and the ignitrons are rendered conductive later in each positive half-period. This effects a substantial reduction in the welding current to prevent an excessive temperature during the break of the arc, which would be effective in producing a crater in the weld.

Although we have shown a preferred embodiment and a modification of our invention, we realize that other modifications thereof are possible. Our invention therefore is intended to be restricted only by the spirit of the invention and the teachings of the prior art.

We claim as our invention:

1. A control system for use in supplying current from a source to a variable impedance load connected to said source, comprising electric valve means interposed between said source and load to control the flow of current through said load, means for developing a voltage which varies with the load current, and control means responsive to said voltage for controlling said valve means in accordance therewith to maintain said load current substantially constant while the impedance of said load is varied.

2. A control system for use in supplying current from a source of alternating current to a variable impedance load connected to said source, comprising electric discharge valve means of the arc-like type interposed between said source and load to control the flow of current through said load, means for developing a voltage which varies with said load current, and control means responsive to said voltage for rendering said valve means conductive at an instant in each positive half-period of said source in accordance with said voltage to maintain said load current substantially constant while the impedance of said load is varied.

3. A control system for use in supplying current from a source of polyphase alternating current to a variable impedance load, comprising means including an electric valve connecting each phase of said source to said load, said valves controlling the flow of current through said load, means for developing a voltage which varies with the load current, and control means responsive to said voltage for controlling said valves in accordance therewith to maintain said load current substantially constant while the impedance of said load is varied.

4. A control system for use in supplying current from a source to an arc welding load connected to said source and including a work member and an arc electrode between which an arc is to be maintained, comprising electric valve means interposed between said load and source to control the flow of current through said load, means for developing a voltage which varies with the load current, and control means connected to said valve means and responsive to said voltage for controlling said valve means in accordance therewith to maintain said load current substantially constant, as the length of the arc between said electrode and work member is varied.

5. A control system for use in supplying current from a source of polyphase alternating potential to an arc welding load connected to all the phases of said source and including a work member and an arc electrode between which an arc is to be maintained, comprising an electric discharge valve of the arc-like type for each phase of said source interposed between the corresponding phase and the load to control the flow of current through the load, current responsive means for developing a voltage which varies with the load current, and control means connected to each valve and responsive to said voltage for rendering each of said valves conductive at an instant in the positive half-period of the corresponding phase potential to maintain said load current substantially constant, as the length of the arc between the electrode and work member is varied.

6. A control system for use in supplying current from a source to a variable impedance load connected to said source, comprising electric valve means interposed between said source and load, means for developing a first substantially constant voltage of a predetermined magnitude, means for developing a second voltage of a magnitude which varies in accordance with the magnitude of the current through said load, and control means responsive to the difference between said first and second voltages for controlling said valve means to maintain said load current substantially constant while the impedance of said load is varied.

7. A control system for use in supplying current from a source to an arc welding load connected to said source and including a work member and an arc electrode between which an arc is to be maintained, comprising electric valve means interposed between said load and source to control the flow of current through said load, means for developing a first voltage of a predetermined substantially constant magnitude, means for developing a second voltage of a magnitude which varies with the current through said load, and control means responsive to the difference in magnitudes between said first and second voltages for controlling said valve means to maintain said load current substantially constant, as the length of the arc between the electrode and work member is varied.

8. A control system for use in supplying current from a source of alternating current to an arc welding load connected to said source and including a work member and an arc electrode between which an arc is to be maintained, comprising electric discharge valve means of the arc-like type interposed between said load and source to control the flow of current through said load, means for developing a first voltage of a predetermined substantially constant magnitude, means for developing a second voltage of a magnitude which varies with the current through said load, and control means responsive to the difference in magnitudes between said first and second voltages for rendering said valve means conductive in each positive half-period of said source at an instant to maintain said load current substantially constant, as the length of the arc between the electrode and work means is varied.

9. A control system for use in supplying current from a source of alternating potential to an arc welding load connected to said source and including a work member and an arc electrode between which an arc is to be maintained, comprising electric discharge valve means of the arc-like type interposed between said load and source to control the flow of current through said load, control means for rendering said valve means conductive in each positive half-period of said source when a potential more positive than a predetermined critical potential is impressed on said control means, means for impressing on said control means an alternating potential displaced in phase relative to said source superimposed on a potential which varies with the load current, the magnitudes of said impressed potentials being so related that the resultant impressed potential becomes more positive than said critical potential at an instant in each positive half-period to maintain said load current substantially constant, as the length of the arc between the electrode and work means is varied.

10. A control system for use in supplying current from a source of alternating potential to an arc welding load connected to said source and including a work member and an arc electrode between which an arc is to be maintained, comprising electric discharge valve means of the arc-like type interposed between said load and source to control the flow of current through said load, control means for rendering said valve means conductive in each positive half-period of said source when a potential more positive than a predetermined critical potential is impressed on said control means, means for impressing on said control means an alternating potential displaced in phase relative to said source superimposed on a potential equal to the difference between a substantially constant potential of a predetermined magnitude and a potential the magnitude of which varies with the load current, the magnitudes of said impressed potentials being so related that the resultant impressed potential becomes more positive than said critical potential at an instant in each positive half-period to maintain said load current substantially constant, as the length of the arc between the electrode and work means is varied.

11. A control system for use in supplying current from a source to an arc welding load connected to said source including a work member and an adjacent arc electrode between which an arc is to be maintained, comprising electric valve means interposed between said source and load to control the flow of current through said load, means for developing a voltage which varies with said load current, and control means connected to said valve means and responsive to said voltage for controlling said valve means in accordance therewith to maintain said load current substantially constant, said control means including means interposing a predetermined time delay in the response of the control means to change in said voltage.

12. A control system for use in supplying current from a source of alternating potential to a variable impedance load connected to said source, comprising electric discharge valve means of the arc-like type interposed between said source and load to control the flow of current through said load, control means responsive to the load current for rendering said valve means conductive at an instant in each positive half-period of said source to maintain said load current substantially constant while the impedance of said load is varied, and additional means responsive to the potential across said load and connected to said control means to render said valve means conductive at an instant in each positive half-period to cause said load current to vary inversely with the load potential when the load potential is below a preselected value.

13. A control system for use in supplying current from a source to a variable impedance load, comprising electric valve means interposed between said source and load to control the flow of current through the load, control means normally responsive to the load current for controlling said valve means to maintain said load current substantially constant, and means connected to said control means and responsive to the potential across said load for causing said control means to be responsive to said load potential when it is below a predetermined value to vary the load current inversely with the load potential.

14. A control system for use in supplying current from a source to an arc welding load connected to said source and including an arc electrode and a work member between which an arc is to be established, comprising electric valve means to be interposed between said source and load to control the flow of current through the load, means for developing a control voltage which normally varies with the load current, control means responsive to said control voltage for controlling said valve means in accordance therewith normally to maintain said load current substantially constant, and means connected to said voltage developing means and responsive to a rapid increase in load current as occurs when the electrode is placed in contact with said work member prior to striking an arc, to cause said control voltage to assume momentarily a value causing a temporary surge of load current through said valve means.

15. A control system for use in supplying current from a source to an arc-welding load adapted to be connected to said source and including a work member and an arc electrode between which an arc is to be established, electric valve means interposed between said load and source to control the flow of current through the load, control means normally responsive to the load current for controlling said valve means to maintain said load current substantially constant, means connected to said control means and responsive to the potential across said load for causing said control means to be responsive to said load potential when it is below a predetermined value to vary the load current inversely with the load potential, said control means including means interposing a predetermined time delay in the response of said control means to a rapid decrease in load current as occurs when the arc electrode is quickly removed from a position adjacent the work member to end a welding operation.

16. A control system for use in supplying current from a source to an arc welding load connected to said source and including a work member and an arc electrode between which an arc is to be maintained, comprising electric valve means interposed between said load and source to control the flow of current to the load, means for developing a first voltage of a predetermined substantially constant magnitude, means for developing a second voltage the magnitude of which varies with the current through said load, control means responsive to the difference in magnitudes between said first and second voltages for controlling said valve means to maintain said load current substantially constant, and means connected to said first voltage developing means and responsive to the potential across said load when said load potential is less than a predetermined value to cause said first voltage to vary inversely with the load potential whereby said control means effects control of said valve means to cause the load current to vary inversely as the load potential.

17. A control system for use in supplying current from a source to a variable impedance load, comprising electric valve means interposed between said source and load to control the flow of current through said load, means for developing a control voltage which normally varies with the current through the load, an auxiliary electric discharge device connected to said voltage developing means and effective when conductive to cause the control voltage to vary substantially with the current through said device, a control circuit for said auxiliary device responsive to the potential across said load to cause said device to be conductive only while said load potential is less than a preselected value with the current through said device varying with said load potential, and control means responsive to said control voltage for controlling said valve means in accordance therewith to maintain said load current normally substantially constant and to vary the load current substantially inversely with the load potential when it is less than said preselected value.

18. A control system for use in supplying current from a source to a variable impedance load, comprising electric valve means interposed between said source and load to control the flow of current through said load, an impedance element, means including means forming an auxiliary source of current for developing a first voltage across said element of a predetermined substantially constant magnitude, means for developing a second voltage the magnitude of which varies with the current through the load, an auxiliary electric discharge device in circuit with said element and auxiliary source and effective when conductive to cause the voltage across said element to vary substantially with the current through said device, a control circuit for said auxiliary device responsive to the potential across said load to cause said device to be conductive only while said load potential is less than a preselected value with the current through said device varying with the load potential, and control means responsive to the difference in magnitudes of said first and second voltages for controlling said valve means normally to maintain said load current substantially constant, said first voltage having a magnitude when said auxiliary device is conductive causing the control means to control said valve means to vary the load current substantially inversely with the load potential.

19. An arc welding system for use with a source of alternating potential, comprising an arc welding load adapted to be connected to said source and including a work member and an arc electrode between which an arc is to be established and a relatively high impedance shunt circuit across said electrode and work member, electric valve means of the arc-like type interposed between said load and source to control the flow of current through the load, means for developing a control voltage which normally varies with the current through said load, control means responsive to said control voltage for rendering said valve means conductive normally in positive half-periods of said source potential at instants tending to maintain said load current substantially constant, and means connected to said voltage developing means and effective only while said load current is at a value indicating that no current is flowing through the arc-electrode and work member to cause the control voltage to assume a value causing said control means to render said valve means conductive in positive half-periods at instants maintaining the potential between said electrode and work below an operating value.

20. An arc welding system for use with a source of alternating potential, comprising an arc welding load adapted to be connected to said source and including a work member and an arc electrode between which an arc is to be established and a relatively high impedance shunt circuit across said electrode and work member, electric valve means of the arc-like type interposed between said load and source to control the flow of current through the load, means for developing a control voltage which normally varies with the current through said load, control means responsive to said control voltage for rendering said valve means conductive normally in positive half-periods of said source potential at instants tending to maintain said load current substantially constant, first auxiliary means connected to said voltage developing means and effective only while said load current is at value indicating that no current is flowing through the arc electrode and work means to cause said control voltage to assume a value at which said control means renders said valve means conductive in positive half-periods at instants maintaining the potential between said electrode and work below an operating value, and second auxiliary means responsive to the potential across said load and connected to said voltage developing means and effective when the load potential is less than a predetermined value and current is flowing between said electrode and work means to cause the control voltage to vary with the load potential in a manner resulting in control of said valve means by said control means to vary the load current substantially inversely with the load potential.

21. Apparatus according to claim 20 in which said control means includes means interposing a predetermined time delay in the response of said control means to a rapid decrease in said control voltage as occurs when the arc electrode is quickly removed from a position adjacent the work member to end a welding operation.

22. A control system for use in supplying current from a source to a variable impedance load, comprising electric valve means interposed between said source and load to control the flow of current through said load, means for developing a control voltage which normally varies with the current through the load, means connected to said voltage developing means and responsive to the potential across the load to cause said control voltage to vary substantially inversely with the load potential when said load potential is below a predetermined value, said control means responsive to said control voltage for controlling said valve means in accordance therewith to maintain said load current substantially constant when said load potential is above said value and to vary the load current inversely with the load potential when it is below said value.

23. A control system for use in supplying current from a source to an arc welding load connected to said source and including an arc electrode and a work member between which an arc is to be established, comprising electric valve means to be interposed between said source and load to control the flow of current through the load, means for developing a first voltage which varies with the load current, an impedance element in circuit with an auxiliary discharge device across an auxiliary source of current, an auxiliary control means for said auxiliary device normally causing it to conduct a substantially constant current thereby producing a substantially constant second voltage across said impedance element, and main control means responsive to the difference of said first and second voltages for controlling said valve means to maintain normally a substantially constant load current, said auxiliary control means being responsive to a rapid increase in said first voltage to cause a momentary increase in current through said auxiliary device to increase the second voltage causing a temporary surge in load current through said valve means.

SLAVO J. MURCEK.
ROBERT W. PRICE.

REFERENCES CITED

The following references are of record in the file of this patent:

UNITED STATES PATENTS

| Number | Name | Date |
| --- | --- | --- |
| 2,085,060 | Young | June 29, 1937 |
| 2,318,091 | Myers | May 4, 1943 |